US008831950B2

United States Patent
Moore et al.

(10) Patent No.: US 8,831,950 B2
(45) Date of Patent: *Sep. 9, 2014

(54) AUTOMATED VOICE ENABLEMENT OF A WEB PAGE

(75) Inventors: Victor S. Moore, Lake City, FL (US); Wendi L. Nusbickel, Boca Raton, FL (US)

(73) Assignee: Nuance Communications, Inc., Burlington, MA (US)

( * ) Notice: Subject to any disclaimer, the term of this patent is extended or adjusted under 35 U.S.C. 154(b) by 1314 days.

This patent is subject to a terminal disclaimer.

(21) Appl. No.: 12/099,028

(22) Filed: Apr. 7, 2008

(65) Prior Publication Data

US 2009/0254346 A1  Oct. 8, 2009

(51) Int. Cl.
| | | |
|---|---|---|
| *G01L 21/00* | (2006.01) | |
| *G10L 19/00* | (2013.01) | |
| *G10L 25/90* | (2013.01) | |
| *G06F 15/16* | (2006.01) | |
| *G06F 3/048* | (2013.01) | |
| *G06F 3/00* | (2006.01) | |
| *H04M 3/493* | (2006.01) | |
| *G10L 15/26* | (2006.01) | |

(52) U.S. Cl.
CPC .......... *G10L 15/265* (2013.01); *H04M 3/4938* (2013.01)
USPC .......... 704/270; 715/825; 715/700; 715/215; 709/217; 709/206; 704/9; 704/275; 704/270.1; 704/266; 704/257; 704/254; 704/235; 379/88.17; 379/88.01; 379/67.1

(58) Field of Classification Search
USPC .............. 704/270.1, 238, 239, 243, 244, 233, 704/270
See application file for complete search history.

(56) References Cited

U.S. PATENT DOCUMENTS

| | | | |
|---|---|---|---|
| 5,369,577 A | 11/1994 | Kadashevich et al. | |
| 5,794,189 A | 8/1998 | Gould | |
| 6,314,398 B1 | 11/2001 | Junqua et al. | |
| 6,587,822 B2 * | 7/2003 | Brown et al. | 704/275 |

(Continued)

FOREIGN PATENT DOCUMENTS

| | | |
|---|---|---|
| CN | 1735929 A | 2/2006 |
| CN | 1752975 A | 3/2006 |

OTHER PUBLICATIONS

Fielding, Roy Thomas. Architectural Styles and the Design of Network-based Software Architectures. Doctoral dissertation, University of California, Irvine, 2000.*

(Continued)

*Primary Examiner* — Matthew Baker
(74) *Attorney, Agent, or Firm* — Wolf, Greenfield & Sacks, P.C.

(57) ABSTRACT

Embodiments of the present invention provide a method, system and computer program product for the automated voice enablement of a Web page. In an embodiment of the invention, a method for voice enabling a Web page can include selecting an input field of a Web page for speech input, generating a speech grammar for the input field based upon terms in a core attribute of the input field, receiving speech input for the input field, posting the received speech input and the grammar to an automatic speech recognition (ASR) engine and inserting a textual equivalent to the speech input provided by the ASR engine into a document object model (DOM) for the Web page.

20 Claims, 2 Drawing Sheets

(56) References Cited

U.S. PATENT DOCUMENTS

| | | |
|---|---|---|
| 6,604,075 B1 | 8/2003 | Brown et al. |
| 6,792,576 B1 | 9/2004 | Chidlovskii |
| 6,813,603 B1 | 11/2004 | Groner et al. |
| 7,003,464 B2 * | 2/2006 | Ferrans et al. ............ 704/270.1 |
| 7,020,841 B2 * | 3/2006 | Dantzig et al. ................ 715/727 |
| 7,177,814 B2 * | 2/2007 | Gong et al. ................ 704/270.1 |
| 7,222,073 B2 * | 5/2007 | Julia et al. .................... 704/257 |
| 7,260,535 B2 * | 8/2007 | Galanes et al. ............... 704/270 |
| 7,308,408 B1 | 12/2007 | Stifelman et al. |
| 7,409,349 B2 * | 8/2008 | Wang et al. ................ 704/270.1 |
| 7,506,022 B2 * | 3/2009 | Wang et al. .................. 709/203 |
| 7,610,547 B2 * | 10/2009 | Wang et al. .................. 715/205 |
| 7,613,610 B1 | 11/2009 | Zimmerman et al. |
| 7,640,163 B2 | 12/2009 | Charney et al. |
| 7,660,400 B2 | 2/2010 | Bangalore et al. |
| 7,660,855 B2 | 2/2010 | Arning et al. |
| 7,711,570 B2 * | 5/2010 | Galanes et al. .............. 704/277 |
| 7,725,320 B2 | 5/2010 | Bennett |
| 7,729,913 B1 | 6/2010 | Lee et al. |
| 7,747,442 B2 | 6/2010 | Doyle |
| 7,827,033 B2 | 11/2010 | Ativanichayaphong et al. |
| 7,873,523 B2 | 1/2011 | Potter et al. |
| 8,000,965 B2 | 8/2011 | Yamamoto et al. |
| 8,073,692 B2 | 12/2011 | Ativanichayaphong et al. |
| 8,150,699 B2 | 4/2012 | Patch |
| 8,543,404 B2 | 9/2013 | Moore et al. |
| 2001/0013001 A1 | 8/2001 | Brown et al. |
| 2002/0090062 A1 | 7/2002 | Mohamed Alhadad et al. |
| 2002/0091528 A1 * | 7/2002 | Daragosh et al. ......... 704/270.1 |
| 2002/0143529 A1 | 10/2002 | Schmid et al. |
| 2003/0055649 A1 * | 3/2003 | Xu et al. ..................... 704/270 |
| 2003/0071833 A1 | 4/2003 | Dantzig et al. |
| 2003/0200080 A1 | 10/2003 | Galanes et al. |
| 2003/0225825 A1 * | 12/2003 | Healey et al. ................ 709/203 |
| 2004/0138890 A1 * | 7/2004 | Ferrans et al. ............ 704/270.1 |
| 2004/0153323 A1 | 8/2004 | Charney et al. |
| 2004/0172254 A1 | 9/2004 | Sharma et al. |
| 2004/0199375 A1 | 10/2004 | Ehsani et al. |
| 2004/0230434 A1 * | 11/2004 | Galanes et al. ............ 704/270.1 |
| 2005/0071172 A1 | 3/2005 | James |
| 2005/0135571 A1 * | 6/2005 | Bangalore et al. ......... 379/88.01 |
| 2005/0154580 A1 * | 7/2005 | Horowitz et al. ................ 704/9 |
| 2006/0064302 A1 * | 3/2006 | Ativanichayaphong et al. ............................ 704/235 |
| 2006/0074652 A1 | 4/2006 | Ativanichayaphong et al. |
| 2006/0156278 A1 | 7/2006 | Reager |
| 2006/0168095 A1 | 7/2006 | Sharma et al. |
| 2006/0235694 A1 | 10/2006 | Cross et al. |
| 2006/0288309 A1 | 12/2006 | Cross et al. |
| 2007/0136067 A1 | 6/2007 | Scholl |
| 2007/0179778 A1 * | 8/2007 | Gong et al. ...................... 704/9 |
| 2007/0189493 A1 * | 8/2007 | Keiller et al. ................. 379/235 |
| 2007/0192675 A1 | 8/2007 | Bodin et al. |
| 2007/0198267 A1 | 8/2007 | Jones et al. |
| 2007/0203869 A1 | 8/2007 | Ramsey et al. |
| 2007/0213984 A1 * | 9/2007 | Ativanichayaphong et al. ............................ 704/257 |
| 2008/0140410 A1 | 6/2008 | Ativanichayaphong et al. |
| 2008/0162143 A1 | 7/2008 | Agapi et al. |
| 2008/0208567 A1 | 8/2008 | Brockett et al. |
| 2008/0208590 A1 | 8/2008 | Cross et al. |
| 2008/0255851 A1 | 10/2008 | Ativanichayaphong et al. |
| 2008/0319757 A1 * | 12/2008 | Da Palma et al. .......... 704/270.1 |
| 2009/0254346 A1 * | 10/2009 | Moore et al. .................. 704/260 |
| 2009/0254347 A1 * | 10/2009 | Moore et al. .................. 704/260 |
| 2009/0254348 A1 | 10/2009 | Moore et al. |
| 2009/0254891 A1 * | 10/2009 | Cui et al. ...................... 717/138 |

OTHER PUBLICATIONS

M. Hu et al., "Speech-enabled web services for mobile devices," in Proc. the International Conference on Semantic Web and Web Services, 2006.*

International Search Report and Written Opinion of PCT Application No. PCT/EP2009/054008, dated Jun. 30, 2009.

International Search Report and Written Opinion of International Application No. PCT/EP2009/054008, dated Jun. 30, 2009.

Office Action in Chinese Patent Application No. 200980119849.8 dated Nov. 30, 2011.

Office Action in Chinese Patent Applicatio No. 200980119849.8 dated Mar. 26, 2012.

* cited by examiner

AUTOMATED VOICE ENABLEMENT OF A
WEB PAGE

REFERENCE TO CO-PENDING APPLICATIONS
FOR PATENT

The present application is related to the following co-assigned U.S. Patent Applications, which are expressly incorporated by reference herein:

U.S. application Ser. No. 12/099.036, now U.S. Pat. No. 8,543,404, entitled "PROACTIVE COMPLETION OF INPUT FIELDS FOR AUTOMATED VOICE ENABLEMENT OF A WEB PAGE", filed on Apr. 7, 2008.

U.S. application Ser. No. 12/099,041, entitled "FREE FORM INPUT FIELD SUPPORT FOR AUTOMATED VOICE ENABLEMENT OF A WEB PAGE", filed on Apr. 7, 2008.

BACKGROUND OF THE INVENTION

1. Field of the Invention

The present invention relates to the field of speech recognition and more particularly to voice input processing in a Web page.

2. Description of the Related Art

Speech recognition systems perform a critical role in commerce by providing an essential reduction in operating costs in terms of avoiding the use of expensive human capital in processing human speech. Generally, speech recognition systems include speech recognition and text-to-speech processing capabilities coupled to a script defining a conversational flow. Consequently, speech recognition systems can be utilized to provide a voice interactive experience for speakers just as if a live human had engaged in a person-to-person conversation.

Speech recognition systems have proven particularly useful in adapting computer based information systems to the audible world of voice processing. In particular, while Web based information systems have been particularly effective in collecting and processing information from end users through the completion of fields in an on-line form, the same also can be said of speech recognition systems. In particular, Voice XML and equivalent technologies have provided a foundation upon which Web forms have been adapted to voice. Consequently, speech recognition systems have been configured to undertake complex data processing through forms based input just as would be the case through a conventional Web interface.

Integrating speech processing with Web pages of a Web application is not for the feint of heart. Expertise is required not only in the field of Web page and Web application development, but also in the field of speech application development. Integral to speech application development is the design and use of a speech grammar reflecting the intended use of the speech application. In that expected information for different fields in a Web form can vary from field to field, in many instances, a different grammar must be generated for each field.

Thus, the speech development component of a voice enabled application often occurs concurrently with the development of the Web application and requires coordination between the speech developer and the Web developer. Only then can both be combined into a single voice enabled Web application. Given the complexity of this task, voice enabled applications elude widespread adoption for many types of businesses simply because many businesses lack the resources and expertise to coordinate the development of a voice enabled application. Consequently, an important modality of interaction oftentimes is omitted from Web distributed content and customers suffer as a result.

BRIEF SUMMARY OF THE INVENTION

Embodiments of the present invention address deficiencies of the art in respect to the voice enablement of a Web page and provide a novel and non-obvious method, system and computer program product for the automated voice enablement of a Web page. In an embodiment of the invention, a method for voice enabling a Web page can include selecting an input field of a Web page for speech input, generating a speech grammar for the input field based upon terms in a core attribute of the input field, receiving speech input for the input field, posting the received speech input and the grammar to an automatic speech recognition (ASR) engine and inserting a textual equivalent to the speech input provided by the ASR engine into a document object model (DOM) for the Web page.

In another embodiment of the invention, a Web application data processing system can be enabled for voice enablement of a Web page. The system can include a voice enablement widget including program code enabled to generate a speech grammar for an input field in a Web page based upon terms in a core attribute of the input field, to receive speech input for the input field, to post the received speech input and the grammar to a communicatively coupled ASR engine, and to insert a textual equivalent to the speech input provided by the ASR engine into a DOM for the Web page. Optionally, the core attribute can be a hidden title field. Further, the terms can include permitted terms for a corresponding grammar. Yet further, the terms also can include a prefix, a semantic indicator or both. Finally, the ASR engine can be a representational state transfer (REST) compliant ASR engine.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL
VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the present invention provide a method, system and computer program product for the automated voice enablement of a Web page. In accordance with an embodiment of the present invention, a Web page of a Web application can be rendered in a content browser and voice input can be received for an input field of the Web page. A grammar can be determined for the input field, and if the grammar cannot be determined, a grammar can be dynamically generated for the input field. In this regard, a core attribute of the input field, such as the title of the input field, can specify permissible input for the input field, or the core attribute can reference an existing grammar.

In either case, the grammar and the voice input can be posted to a speech recognition engine from the content browser and a textual equivalent can be received in return. For instance, a REST compliant speech recognition engine can receive the posting of the voice input and grammar from the content browser and the speech recognition engine can return to the content browser a textual equivalent to the voice input, for example text formatted according to the Javascript Object Notation (JSON). Thereafter, the textual equivalent can be inserted into a DOM for the Web page and the portion of the Web page affected by the insertion can be re-rendered to provide a visualization of the text input for the input field.

In this way, the Web application can be voice enabled even in the absence of specific expertise in speech application development. In particular, one seeking to voice enable fields of a Web page in a Web application need only specify permitted terms for the input field within a core attribute of the input field. The speech grammar can be generated automatically with reference to the core attribute of the input field. Further, the textual equivalent of voice input for the input field can be seamless integrated into the input field by inserting the textual equivalent directly into the DOM for the Web page. Thus, no speech recognition expertise is required to speech enable the Web page of the Web application.

Figure 1:
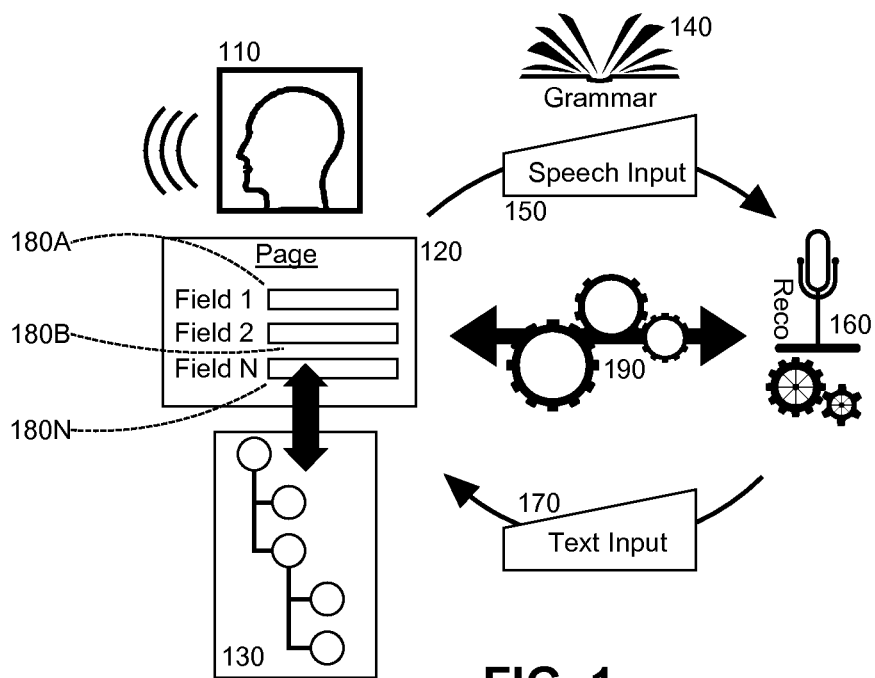
FIG. 1 is a pictorial illustration of a process for the automated voice enablement of a Web page.

In illustration, FIG. 1 pictorially shows a process for the automated voice enablement of a Web page. As shown in FIG. 1, a Web page 120 of a Web application (not shown) can be represented by DOM 130 produced by a content browser (not shown) rendering the Web page 120. The DOM 130 can define within the Web page 120 one or more different input fields 180A, 180B, 180N. Each of the input fields 180A, 180B, 180N can include a core, hidden attribute, such as a title. It is to be recognized by the skilled artisan that core attributes of markup language element like an input field are well-known and well-documented according to the Hypertext Markup Language (HTML) specification.

Voice enablement widget 190 can process speech input 150 provided by end user 110 for a given one of the input fields 180A, 180B, 180N. Specifically, upon received of speech input 150 from end user 110, it can be determined whether or not a grammar has been specified for the given one of the input fields 180A, 180B, 180N. If not, a grammar 140 can be generated for the given one of the input fields 180A, 180B, 180N by referring to a corresponding core attribute for the given one of the input fields 180A, 180B, 180N. In this regard, an exemplary markup language element for the input fields 180A, 180B, 180N providing permitted terms for a corresponding grammar follows:

```
<form dojoType="VoiceForm" widgetID="command" method="post">
Field_1: <input type="text" name="Field 1" title="term1, term2, term3 "/>
Field_2: <input type="text" name="Field 2" title="term4, term5, term6 "/>
Field_N: <input type="text" name="Field N" title="term7, term8"/>
</form>
```

Additionally, a prefix can be provided for each field such as [the] or [an] or [to] to permit natural speech. Yet further, semantic meaning can be provided for the permitted terms. As an example,

```
<form dojoType="VoiceForm" widgetID="command" method="post">
Field_1: <input type="text" name="Field 1" title="[the] term1, term2, term3 "/>
Field_2: <input type="text" name="Field 2" title="term4, term5, term6 "/>
Field_N: <input type="text" name="Field N" title="(to|$NULL), term7=1, term8=0"/>
</form>
```

In this way, Semantic Interpretation for Speech Recognition (SISR) can be provided for addition to the generated grammar so that the spoken form of a term can be translated to a value within a textual equivalent.

The resulting grammar 140 can reflect the permitted terms, prefix and semantic values, for example as follows:

```
#ABNF 1.0;
language en-US
mode voice;
tag-format <semantics/1.0>;
root $command;
met "author" is "VoiceGrammar Widget";
public $command=$prologue $action ($Field_1 $Field_2 $Field_N)
   $epilogue {$.Field_1=$Field_1; $.Field_2=$Field_2; $.Field_N=$Field_N}
$prologue=please | would you | $NULL
$action = do1 | do2 | doN | $NULL
$Field_1 = ([the] term1 {$="term_1"} | term2 {$="term_2"} | term3 {$="term_3"}"/>
$Field_2 = (term4 {$="term_4"} | term2 {$="term_5"} | term3 {$="term_6"}"/>
$Field_N = ((to|$NULL) term7 {$="term_7"} | term8 {$="term_8"}"/>
$epilogue=thanks | now | $NULL;
```

Optionally, the resulting grammar 140 can be generated only for those of the input fields 180A, 180B, 180N that lack input provided by the end user 110.

The voice enablement widget 190 can provide the resulting grammar 140 with the speech input 150 to a speech recognition service 160, for example a RESTful automatic speech recognition (ASR) engine. The speech recognition service 160 can process the speech input 150 in connection with the grammar 140 to produce a textual equivalent 170 to the speech input 150. The textual equivalent 170 can be returned to the voice enablement widget 190 which in turn can insert the textual equivalent 170 into a portion of the DOM 130 for the Web page 120 corresponding to the given one of the input fields 180A, 180B, 180N. Optionally, the speech input 150 also can be passed to a speaker independent verification (SIV) to perform voice authentication. engine Finally, the DOM 130 can be processed by the content browser (not shown) to re-render the Web page 120 with the textual equivalent 170 shown in the given one of the input fields 180A, 180B, 180N.

Figure 2:
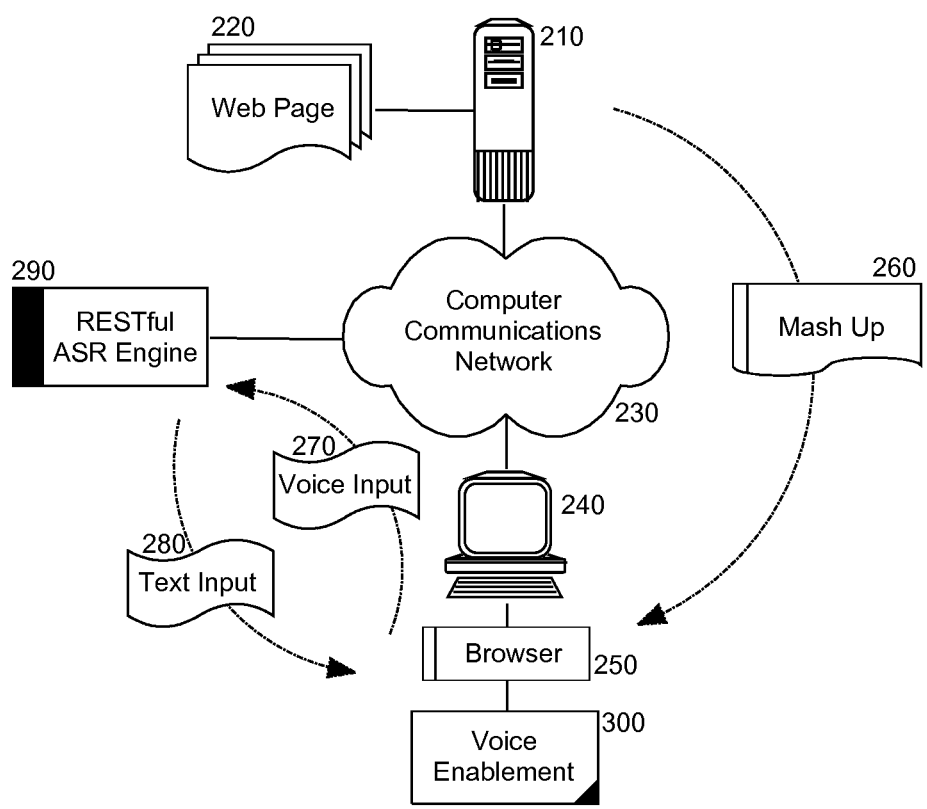
FIG. 2 is a schematic illustration of a Web application data processing system configured for the automated voice enablement of a Web page; and, FIG. 3 is a flow chart illustrating a process for voice enabling a Web page in a Web application data processing system.

The process described in respect to FIG. 1 can be implemented in a Web application data processing system. In illustration, FIG. 2 schematically depicts a Web application data processing system configured for the automated voice enablement of a Web page. The system can include a content server 210 communicatively coupled to a client 240 over computer communications network 230. The content server 210 can be configured to serve Web pages 220 to the client 240 over the computer communications network 230 for rendering in a content browser 250. Optionally, the Web pages 220 each can be a "mash up" 260 of content drawn from multiple different content sources (not shown) distributed about the computer communications network 230.

Voice enablement widget 300 can be coupled to the content browser 250. The voice enablement widget 300 can include computer program code enabled to generate a grammar for providing voice input 270 for a field in the mash up 260 from terms in a core attribute of the input field. The program code further can be enabled to provide both the grammar and the voice input 270 to an ASR engine 290 and to receive in return text input 280 equivalent to the voice input 270. Finally, the program code can be yet further enabled to insert the text input 280 into a DOM for the mash up 260 and to re-render the mash up 260 in the content browser 250 to include the text input 260 in the input field of the mash up 260 into which the voice input 270 had been provided.

Figure 3:
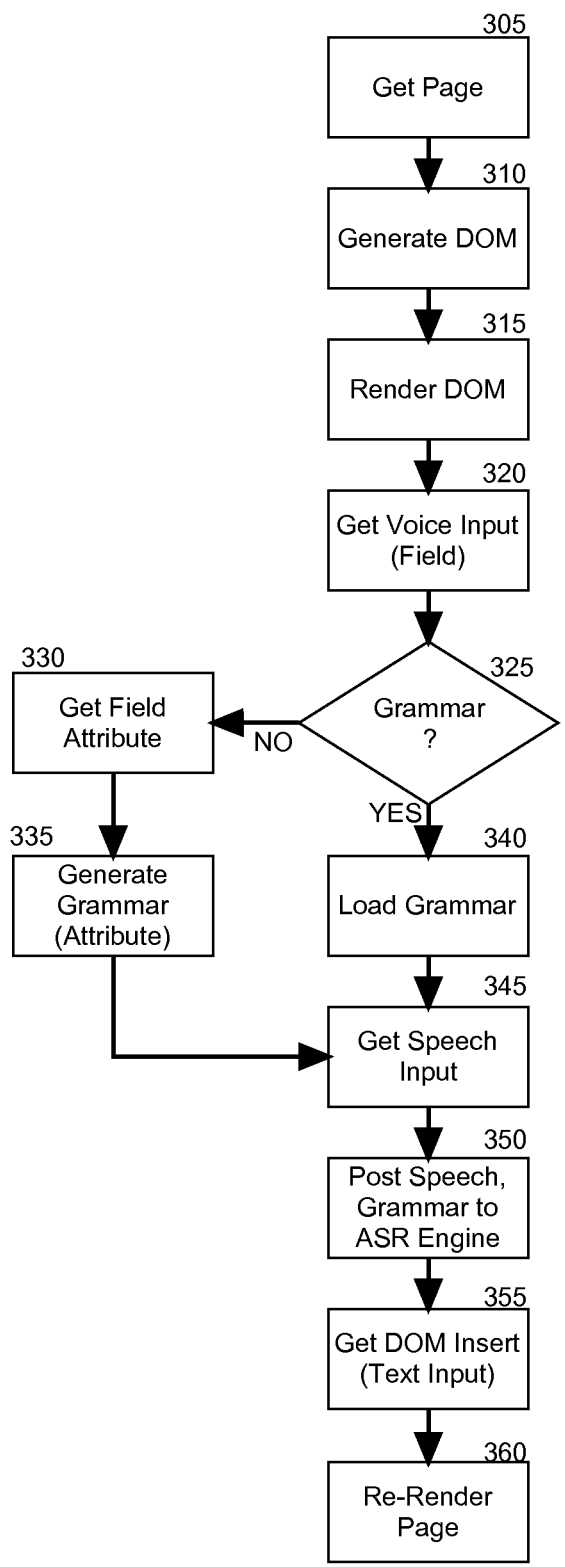

In yet further illustration of the operation of the voice enablement widget 300, FIG. 3 is a flow chart illustrating a process for voice enabling a Web page in a Web application data processing system. Beginning in block 305, a Web page can be received for rendering in a content browser and in block 310 a DOM can be created for the Web page. Subsequently, in block 315 the DOM can be rendered in the content browser as a Web page.

The Web page can provide one or more input fields into which textual input is expected, however, a user interface element can be provided in the Web page in connection with one or more of the input fields that when activated permits speech input to be provided in place of textual input for the input field. As such, in block 320, an input field can be selected for speech input and in decision block 325 it can be determined whether or not a speech grammar exists for the input field. If so, the grammar can be loaded for the input field. Otherwise, in block 330 terms can be retrieved from a core attribute of the input field and in block 335 a speech grammar can be generated based upon the terms.

In either circumstance, in block 345 speech input can be received for the input field and in block 350, the speech input can be posted to a coupled ASR engine along with the speech grammar. Thereafter, in block 355 equivalent text produced by the ASR engine for the speech input can be inserted into a node for the DOM corresponding to the input field. Finally, in block 360 the Web page can be re-rendered to show the textual input in the input field.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, and the like. Furthermore, the invention can take the form of a computer program product accessible from a computer-usable or computer-readable medium providing program code for use by or in connection with a computer or any instruction execution system.

For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

We claim:

1. A method for voice enabling a Web page, the method comprising:
   receiving a selection of an input field of the Web page;
   determining whether a speech grammar exists for the input field;
   generating, by using at least one processor, a speech grammar for the input field in response to determining that the speech grammar does not exist for the input field, wherein generating the speech grammar comprises:
      identifying a plurality of terms associated with the input field, wherein the plurality of terms represent permissible input for the input field and are specified in an attribute of a markup language element for the input field; and
      generating, the speech grammar for the input field based, at least in part, upon the plurality of terms identified in the attribute of the markup language element;
   receiving speech input for the input field;
   providing the received speech input and the generated speech grammar to an automatic speech recognition (ASR) engine configured to recognize the received speech input to produce a textual equivalent to the received speech input using the generated speech grammar; and
   inserting the textual equivalent into the input field.

2. The method of claim 1, wherein the plurality of terms associated with the input field comprise terms in a title attribute of the markup language element for the input field, and wherein generating the speech grammar for the input field comprises generating the speech grammar for the input field based upon the terms in the title attribute of the markup language element for the input field.

3. The method of claim 1, wherein the attribute of the markup language element for the input field specifies the plurality of terms and at least one prefix for one or more of the plurality of terms that may be combined with the one or more of the plurality of terms as permissible input for the input field, and wherein generating the speech grammar for the input field comprises generating the speech grammar for the input field based upon the plurality of terms and the at least one prefix.

4. The method of claim 1, wherein the attribute of the markup language element for the input field specifies the plurality of terms and a semantic indicator for one or more of the plurality of terms, and wherein generating the speech grammar for the input field comprises generating the speech grammar based upon the permitted terms and the semantic indicator for the permitted terms.

5. The method of claim 1, wherein providing the received speech input and the generated speech grammar to the ASR engine, comprises providing the received speech input and the generated speech grammar to a communicatively coupled remote representational state transfer (REST) compliant ASR engine.

6. A system comprising:
at least one processor configured to:
  determine that an input field of the Web page has been selected;
  determine whether a speech grammar exists for the input field;
  generate a speech grammar for the input field in response to determining that the speech grammar does not exist for the input field, wherein generating the speech grammar comprises:
    identifying a plurality of terms associated with the input field wherein the plurality of terms represent permissible input for the input field and are specified in an attribute of a markup language element for the input field; and
    generating the speech grammar for the input field based, at least in part, upon the plurality of terms identified in the attribute of the markup language element;
  determining that speech input has been received for the input field;
  provide the received speech input and the generated speech grammar to a communicatively coupled automatic speech recognition (ASR) engine configured to recognize the received speech input to produce a textual equivalent to the received speech input using the generated speech grammar; and
  insert the textual equivalent into the input field.

7. The system of claim 6, wherein the plurality of terms associated with the input field comprise terms in a title attribute of the markup language element for the input field, and wherein generating the speech grammar for the input field comprises generating the speech grammar for the input field based upon the terms in the title attribute of the markup language element for the input field.

8. The system of claim 6, wherein the attribute of the markup language element for the input field specifies the plurality of terms and at least one prefix for one or more of the plurality of terms that may be combined with the one or more of the plurality of terms as permissible input for the input field, and wherein generating the speech grammar for the input field comprises generating the speech grammar for the input field based upon the plurality of terms and the at least one prefix.

9. The system of claim 6, wherein the attribute of the markup language element for the input field specifies the plurality of terms and a semantic indicator for one or more of the plurality of terms, and wherein generating the speech grammar for the input field comprises generating the speech grammar based upon the permitted terms and the semantic indicator for the permitted terms.

10. The system of claim 6, wherein the ASR engine is a representational state transfer (REST) compliant ASR engine.

11. An article of manufacture comprising a computer-readable medium storing a computer program that, when executed by at least one processor, causes the at least one processor to perform a method for voice enabling a Web page, the method comprising:
  receiving a selection of an input field of the Web page,
  determining whether a speech grammar exists for the input field;
  generating a speech grammar for the input field in response to determining that the speech grammar does not exist for the input field, wherein generating the speech grammar comprises:
    identifying a plurality of terms associated with the input field, wherein the plurality of terms represent permissible input for the input field and are specified in an attribute of a markup language element for the input field; and
    generating, by the at least one processor, the speech grammar for the input field based, at least in part, upon the plurality of terms identified in the attribute of the markup language element;
  receiving speech input for the input field;
  providing the received speech input and the generated speech grammar to an automatic speech recognition (ASR) engine configured to recognize the received speech input to produce a textual equivalent to the received speech input using the generated speech grammar; and
  inserting the textual equivalent into the input field.

12. The article of manufacture of claim 11, wherein the plurality of terms associated with the input field comprise terms in a hidden title attribute of the markup language element for the input field, and wherein generating the speech grammar for the input field comprises generating the speech grammar for the input field based upon the terms in the hidden title attribute of the markup language element for the input field.

13. The article of manufacture of claim 11, wherein the attribute of the markup language element for the input field specifies the plurality of terms and at least one prefix for one or more of the plurality of terms that may be combined with the one or more of the plurality of terms as permissible input for the input field, and wherein generating the speech grammar for the input field comprises generating the speech grammar for the input field based upon the plurality of terms and the at least one prefix.

14. The article of manufacture of claim 11, wherein the attribute of the markup language element for the input field specifies the plurality of terms and a semantic indicator for one or more of the plurality of terms, and wherein generating the speech grammar for the input field comprises generating the speech grammar based upon the permitted terms and the semantic indicator for the permitted terms.

15. The method of claim 1, further comprising generating the speech grammar for the input field only if it is determined that the speech grammar does not exist for the input field.

16. The system of claim 6, wherein the at least one processor is further configured to generate the speech grammar for the input field only if it is determined that the speech grammar does not exist for the input field.

17. The article of manufacture of claim 11, wherein the method further comprises generating the speech grammar for the input field only if it is determined that the speech grammar does not exist for the input field.

18. The method of claim 1, wherein the plurality of terms associated with the input field are in the Web page.

19. The system of claim 6, wherein the plurality of terms associated with the input field are in the Web page.

20. The article of manufacture of claim 11, wherein the plurality of terms associated with the input field are in the Web page.

* * * * *